(12) United States Patent
Dietrich

(10) Patent No.: US 7,438,021 B2
(45) Date of Patent: Oct. 21, 2008

(54) INHALATION THERAPY ENCLOSURE FOR SMALL ANIMALS

(76) Inventor: Bruce E. Dietrich, 900 S. Grand Ave., Charles City, IA (US) 50616

( * ) Notice: Subject to any disclaimer, the term of this patent is extended or adjusted under 35 U.S.C. 154(b) by 81 days.

(21) Appl. No.: 11/351,944

(22) Filed: Feb. 10, 2006

(65) Prior Publication Data

US 2007/0186868 A1    Aug. 16, 2007

(51) Int. Cl.
*A01K 1/03*    (2006.01)
(52) U.S. Cl. .................................. 119/420; 119/417
(58) Field of Classification Search ............... 119/419, 119/678, 120, 417, 418, 420
See application file for complete search history.

(56) References Cited

U.S. PATENT DOCUMENTS

| | | | | |
|---|---|---|---|---|
| 3,126,120 A * | 3/1964 | Crate | .......................... | 220/844 |
| 4,201,153 A * | 5/1980 | Nace | .......................... | 119/224 |
| 4,305,347 A | 12/1981 | Hemenway et al. | ........... | 119/15 |
| 4,343,304 A | 8/1982 | Hickmann | ................... | 128/200 |
| 5,595,317 A * | 1/1997 | Hodge | ........................ | 220/831 |
| 6,352,076 B1 * | 3/2002 | French | .................. | 128/203.12 |

* cited by examiner

*Primary Examiner*—Michael R Mansen
*Assistant Examiner*—Monica L Williams
(74) *Attorney, Agent, or Firm*—Wenzel & Harms, PC; Allan L. Harms

(57) ABSTRACT

An inhalation therapy enclosure includes a base with end walls joined by a rear wall. A cover having two panels joined perpendicularly is hinged to the top of the rear wall. When lowered, the cover forms an enclosure with the end wall, rear wall and base. Latches secure the cover to the base. A port in one end wall allows introduction of nebulized medication or anesthesia while a port of equal size in the opposing end wall allows exhaust from the enclosure.

17 Claims, 5 Drawing Sheets

INHALATION THERAPY ENCLOSURE FOR SMALL ANIMALS

BACKGROUND OF THE INVENTION

This invention pertains to inhalation therapy enclosures for small animals.

In the practice of veterinary medicine, the treatment of diseased or injured animals encompasses administration of medications by injection or by mouth, as well as by inhalation of nebulized medications. Current methods for respiratory therapy through administration of nebulized medications consist of use of a mask held over the nose and mouth of the animal, or by forcing the animal into a closed chamber into which nebulized medication is introduced. Typically, the chamber is an open topped box with a lid held in place to trap the animal inside. Because an animal in compromised health is already under stress, the reaction of an animal to being placed in an open-topped box is to resist this mode of therapy, to become fractious and increasingly stressed and less responsive to therapy. Similarly, the forced placement of a mask over the nose and mouth of a fearful animal is stressful for both animal and veterinarian staff, and results in less successful administration of medication.

In the administration of general anesthesia to small animals, inhalation of anesthetic gases either must be administered by mask or through placement of the animal into an anesthetic induction chamber into which anesthetic gas is introduced. Again the typical anesthetic induction chamber is an open topped plastic box with a lid. In the case of cats and other small animals, the forced placement of the animal into an open topped box frequently results in fractious behavior by the animal accompanied by elevation of stress in the animal and the veterinary staff.

An example of an anesthetic induction chamber for animals is shown in U.S. Pat. No. 6,353,076 to French which shows an elongate box with a top lid and an end door.

BRIEF SUMMARY OF THE INVENTION

The present invention pertains to equipment to assist in the administration of inhalants in the practice of veterinary medicine. Particularly, the invention pertains to administration of nebulized medicaments to small animals such as cats, ferrets, small dogs, rats, birds, small reptiles and like sized pets.

Uncooperative or medically compromised animal patients are easily treated with inhalation therapy provided the inhalation therapy can be successfully administered. The present invention presents an enclosure for small animals which includes a base with a rear wall and opposing end walls upstanding from edges of the base. The combination of the base, rear wall, and opposing end walls provides a structure with an open top and an open side. A cover assembly is attached to the top of the rear wall by hinges such that the cover can be rotated about the hinges to either close the enclosure or to open the enclosure. Rest brackets extend from the rear wall to provide structures for the open cover to rest against. The cover includes a first panel which serves as the top of the resulting enclosure, and a second panel fixed perpendicularly to the first panel, the second panel providing a front wall for the resulting enclosure. A large portion of each panel is an unbreakable transparent window made of tempered or shatterproof glass or clear acrylic or clear polycarbonate. Latching devices are provided on the base and second panel to retain the cover in place when desired. A port is provided through each of the opposing end walls at a height above the mid-point of the end wall. Each port includes a ribbed tube to which a hose may be attached. The diameter of both ports is substantially equal. When desired to be used for administration of nebulized medications, a hose interconnects the first port with a nebulizer. A second hose may be attached to the port on the opposing sidewall to duct away exhaust exiting the second port.

The enclosure may also be used as an anesthetic inhalation chamber. In the case of administration of inhalable anesthetic compounds, the port in the first end wall may be connected to tubing coupled to a source of anesthetic gas and the port in the second end wall may be coupled to a hose transmitting the uninhaled gases to a scavenging or recapture system.

The enclosure may also be used as an oxygen inhalation chamber. In the case of administration of inhalable oxygen, the intake port in the first sidewall may be connected to tubing coupled to a source of oxygen and the exhaust port in the second sidewall may be left open.

The enclosure may also be configured as a portable pet carrier by substitution of the transparent windows in the cover panels by open cage wall structures such that ventilation is adequate.

It is a primary object of the invention to provide an enclosure to receive a small animal requiring inhalation therapy which avoids stress in that animal when the animal is placed in the enclosure. It is a further object to provide an enclosure for small animals which the animal will willingly enter. It is also an object of the invention to provide an inhalation therapy enclosure in which nebulized medication may be effectively administered to an ill animal. Another object of the invention is to provide an inhalation therapy enclosure in which the animal is comfortable and unrestrained. It is yet another object of the invention to provide an enclosure for a small animal which allows observation of the animal while enclosed and from which the animal may observe the environment exterior to the enclosure. A further object of the invention is to provide an transportable enclosure into which a pet owner can place his or her pet preparatory to surgery and which can be used to transport the animal to surgery and in which anesthetic can be conveniently administered without further handling of the pet, while allowing the pet to be observed as anesthetic is administered.

The foregoing and other desirable objects of the invention will be understood from an examination of the detailed description of the invention which follows.

BRIEF DESCRIPTION OF THE SEVERAL VIEWS OF THE DRAWING(S)

Figure 5:
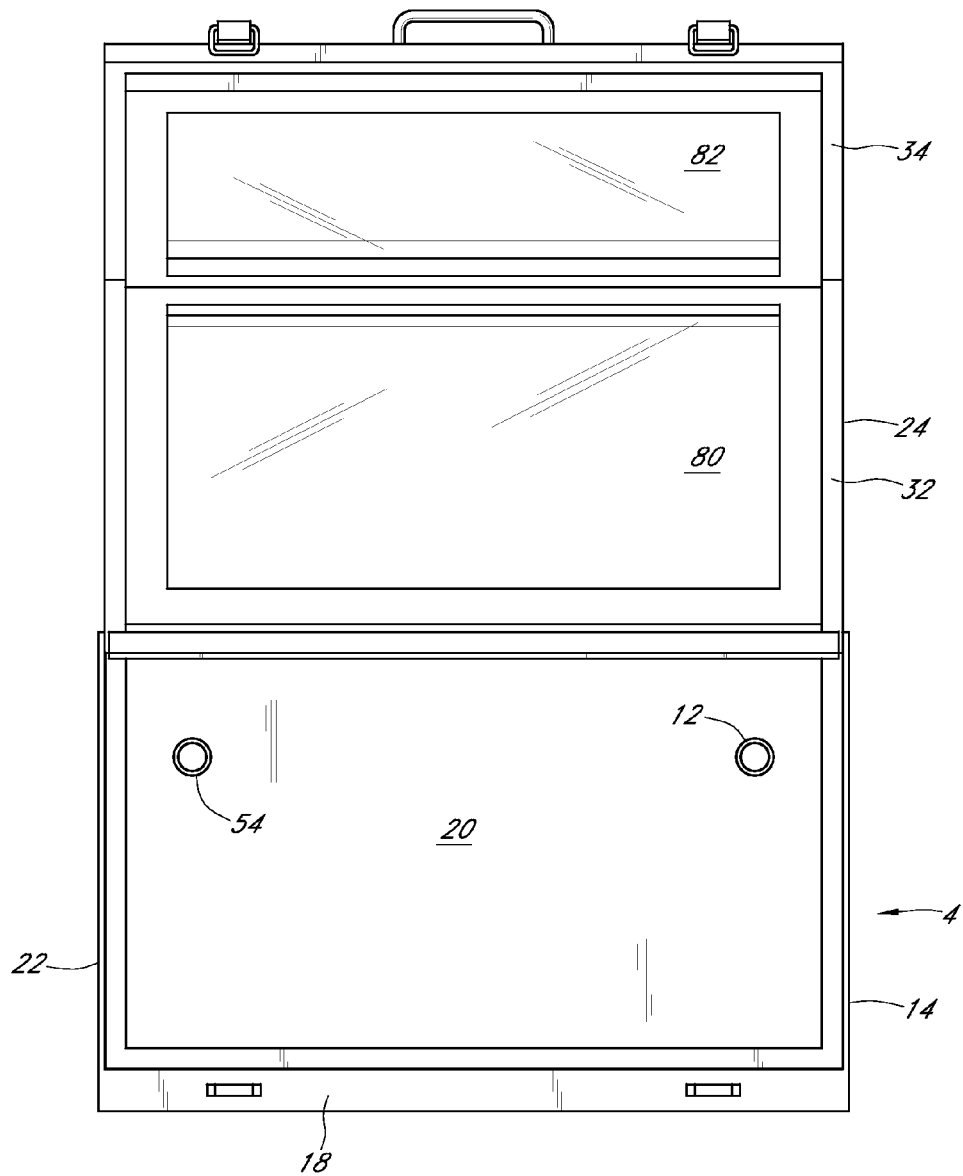

FIG. 5 is a front elevation of an alternative embodiment of the invention wherein intake port 12 and exhaust port 54 are located in rear wall 20 of enclosure 4.

DETAILED DESCRIPTION OF THE INVENTION

This invention is an inhalation therapy enclosure for small animals. The invention may be used as an enclosure for administration of nebulized medication, as an anesthetic induction chamber or as an oxygen inhalation chamber. In an alternative embodiment, the invention may be used as a portable pet carrier.

Figure 1:
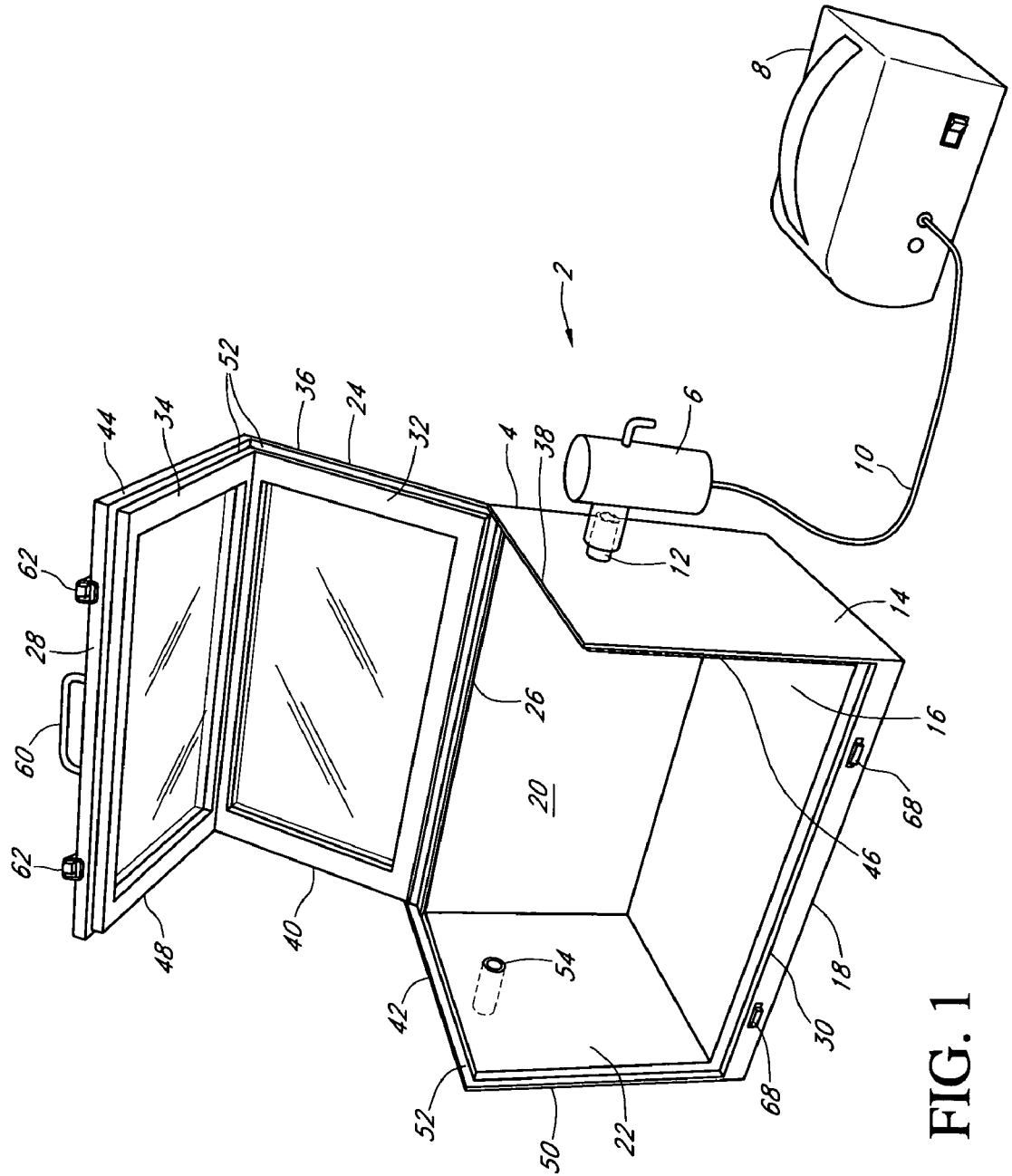
FIG. 1 is a front perspective of a veterinary treatment system for administration of nebulized medication, according to the present invention.

FIG. 1 discloses a system 2 for administration of nebulized medicaments for treatment of veterinary patients. The medicament may be any drug with the property of being delivered via nebulization or atomization including but not limited to antibiotics, bronchodilators, steroids, insulin, oxygen, or any other medicament that can be absorbed in the oral or nasal mucosa or lungs of an animal, or a drug which may be absorbed transdermally.

A closable enclosure 4 is coupled to a nebulizer cup 6 containing a liquid medicament to be nebulized. A nebulizer pump 8 is coupled by air duct 10 to the nebulizer cup 6 such that air may be bubbled through the liquid medicament within nebulizer cup 6 to be atomized to a mist or vapor to be passed through intake port 12 in first sidewall 14 into the interior 16 of enclosure 4. Together the nebulizer pump 8, nebulizer cup 6 and air duct 10 are a nebulizing apparatus which is well known.

Enclosure 4 further comprises a base 18 which serves as a bottom of the enclosure 4, a rear wall 20 and a second sidewall 22 which opposes first sidewall 14. In the substantially rectangular embodiment of enclosure 4 of FIG. 1, each of sidewalls 14, 22 and rear wall 20 is upstanding upon edges of base 18. A cover 24 is hinged to top edge 26 of rear wall 20 such that cover 24 may pivot about top edge 26 of rear wall 20 from an open position as seen in FIG. 1 to a closed position with the free edge 28 of cover 24 abutted to base 18 at the front 30 thereof.

Cover 24 comprises a first panel 32 joined at a substantial perpendicular to second panel 34. First panel 32 is hinged to top edge 26 of rear wall 20. Second panel 34 could be joined to first panel 32 by a hinge if desired, but in the preferred embodiment of FIGS. 1-3, second panel 34 is joined to first panel 32 at a fixed angle. Depending on the geometry of sidewalls 14, 22, first panel 32 could be joined to second panel 34 over a range of angles from approximately forty-five degrees to approximately one hundred thirty-five degrees.

When cover 24 is moved to the closed position, in addition to the abutment of free edge 28 to front 30, first side edge 36 of first panel 32 abuts top edge 38 of first sidewall 14 and second side edge 40 of first panel 24 abuts top edge 42 of second sidewall 22. In addition, first side edge 44 of second panel 34 abuts front edge 46 of first sidewall 14 and second side edge 48 of second panel 34 abuts front edge 50 of second sidewall 22. Rabbets 52 along edges 50, 42, 40, 48 and along edges 46, 38, 36, 44 permit a substantially airtight fit of cover 24 to sidewalls 14 and 22 and to base 18 thereby creating a sealed enclosed space within interior 16 of enclosure 4.

Exhaust port 54 passes through second sidewall 22 to provide a passageway for exhaled or uninhaled gases to escape. Exhaust port 54 may be located in second sidewall 22 at approximately the same vertical position as that of intake port 12 in first sidewall 14, generally above the vertical midpoint thereof.

In the preferred embodiment, the enclosure is rectilinear though other shapes may be employed provided the cover 24 serves as top and a side of the resulting enclosure. The preferred embodiment enclosure 4 encloses a volume of approximately one cubic foot.

Figure 2:
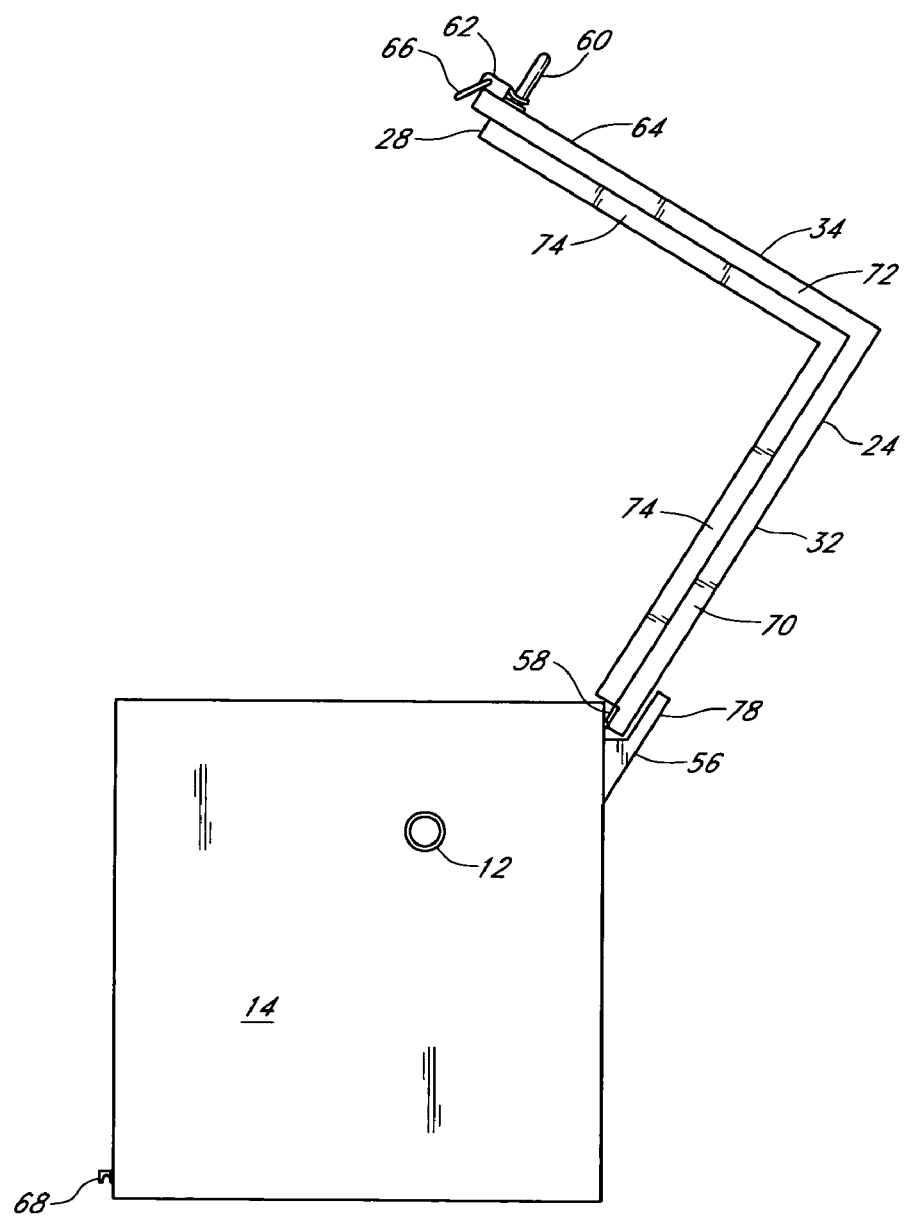
FIG. 2 is a side plan view of the enclosure of the invention with the cover fully open.

Referring now additionally to FIG. 2, it can be seen that enclosure 4 comprises rest brackets 56 against which cover 24 may rest when fully open. Brackets 56 serve as stops to limit the travel of cover 24 about hinge 58. Brackets 56 comprise upwardly extending outwardly angled arms 78.

A handle 60 is mounted to cover 24 near its free edge 28 and a pair of latches 62 are fixed to cover 24 upon outer face 64 of second panel 34 such that the bails 66 of latches 62 may capture catches 68 when cover 24 is lowered to its closed position.

Each of panels 32, 34 of cover 24 further comprises frames 70, 72 which are formed with peripheral recesses 74 to permit the resting of panel edges within rabbets 52 of sidewalls 14, 22 and rear wall 18.

Figure 3:
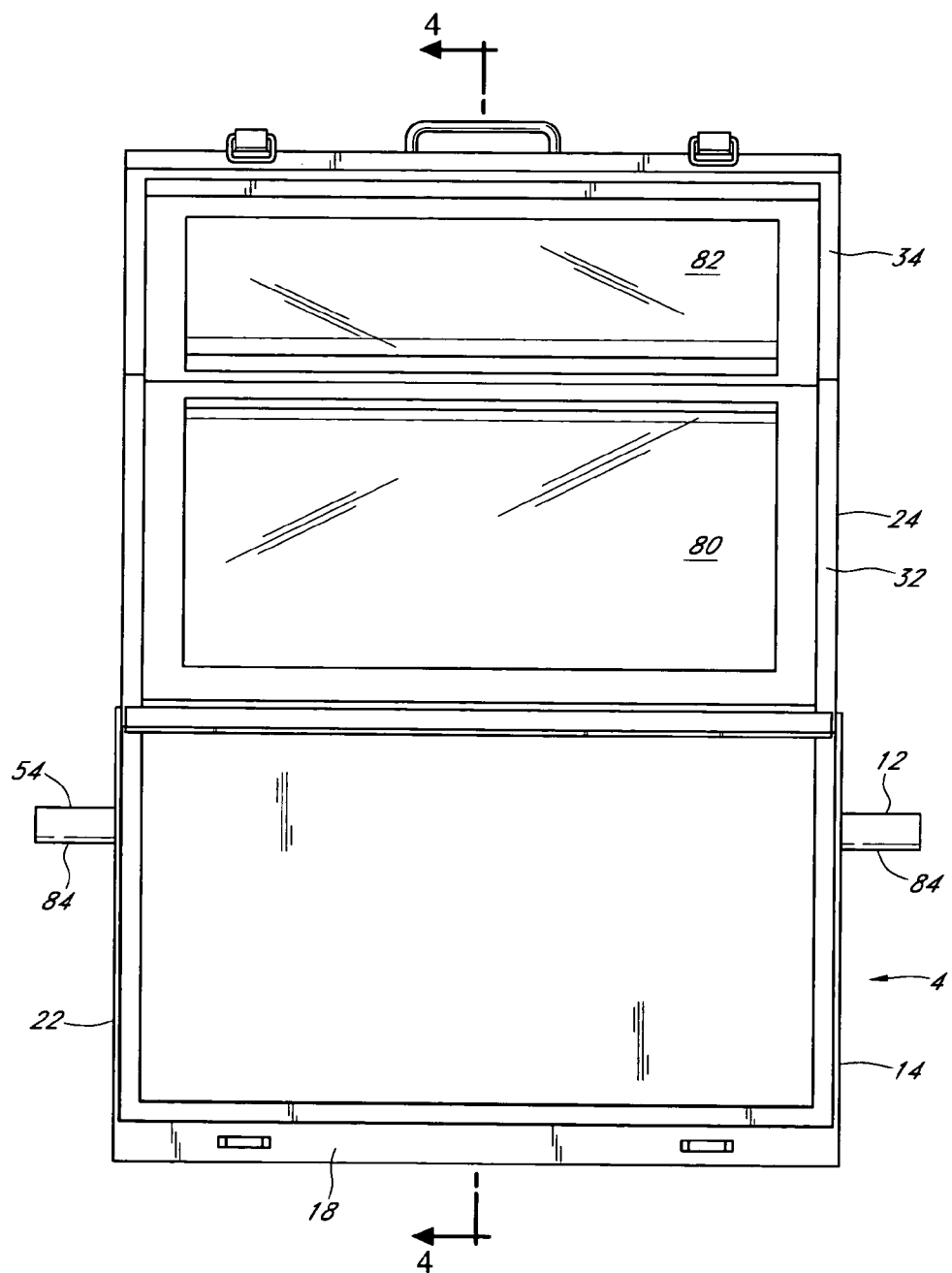
FIG. 3 is a front elevation of the enclosure invention with the cover fully open.

Referring now to FIG. 3, it is seen that each of panels 32, 34 of cover 24 of enclosure 4 includes a transparent window 80, 82 of clear acrylic or clear polycarbonate or of glass, preferably tempered or shatterproof glass. The inclusion of windows 80, 82 provides the ability for veterinary staff to observe a cat or other small animal housed in closed enclosure 4 as anesthesia is administered or as treatment with nebulized medicament is carried out.

It can also be understood from examination of FIG. 3 that intake port 12 and exhaust port 54 comprise tubes 84 which extend from respective sidewalls 14, 22 such that flexible hoses may be attached to the tubes 84 of ports 12 and 54. Tubes 84 may be tapered to ease placement of plastic tubing over them, or they may be provided with annular ribs (not shown) in the conventional manner to assist in frictional retention of tubing to tubes 84.

In the case of the use of enclosure 4 as an anesthesia induction chamber, a source of anesthetic gas (not illustrated) may be coupled to one of ports 12, 54 through conventional hose or tubing so that the anesthetic gas can be passed into the enclosure while uninhaled or exhaled gas may be vented from the port not used for insertion of the anesthetic gas.

The enclosure 4 may also be used as an oxygen inhalation chamber. In the case of administration of inhalable oxygen, the intake port 12 in the first side end wall 14 may be connected to tubing coupled to a source of oxygen and the exhaust port 54 in the second sidewall 22 may be left open.

Figure 4:
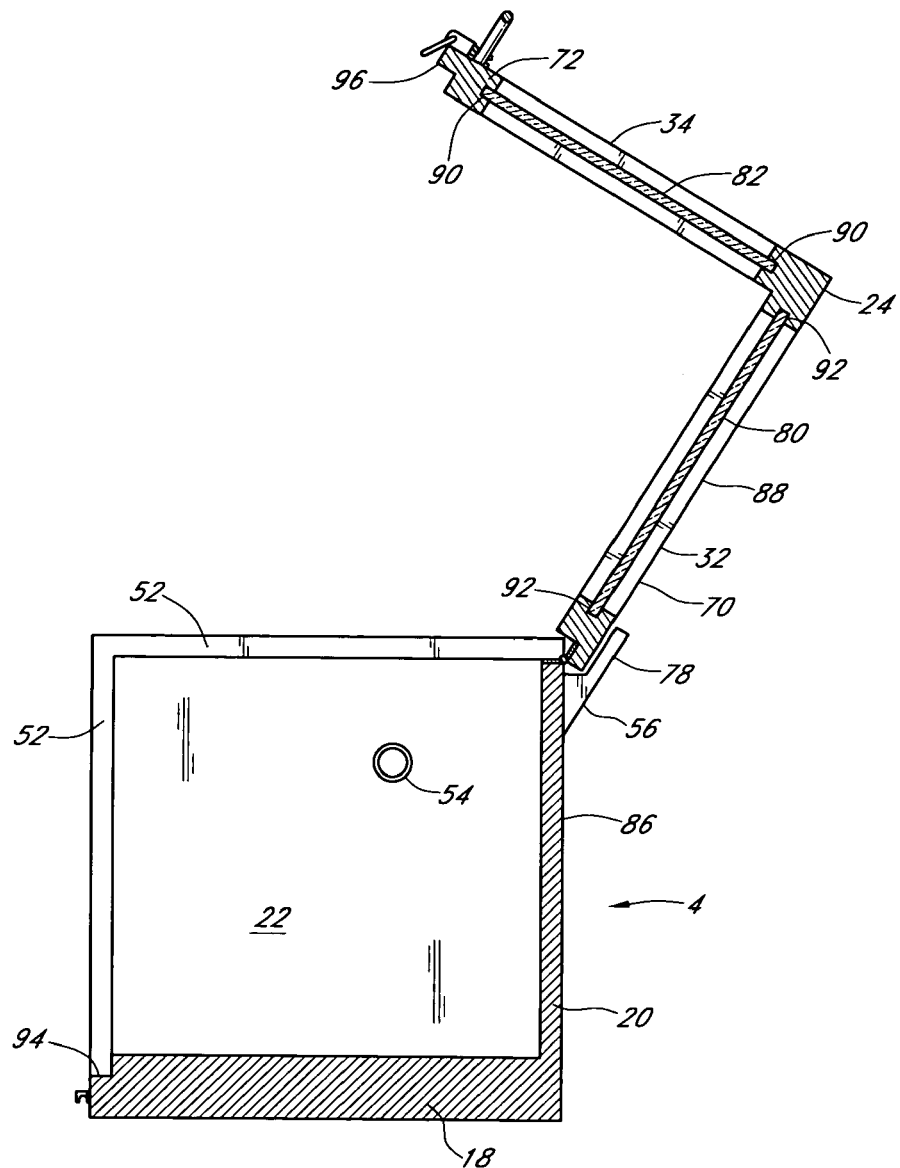
FIG. 4 is a cross section view along line 4-4 of FIG. 3.

Referring now to FIG. 4, a cross section view of the enclosure 4 is illustrated. Bracket 56 extends from outer face 86 of rear wall 20, with the arm 78 of bracket 56 extending upward and away from the plane of outer face 86. Arm 78 is angled appropriately to parallel the outer face 88 of first panel 32 of cover 24 thereby to provide a stop or rest for cover 24 when it is fully open. It can be seen that first panel 32 joins second panel 34 at a substantial perpendicular and that window 82 is retained in slots 90 of frame 72 of second panel 34. Window 82 comprises a substantial area of second panel 34. Similarly, window 80 of first panel 32 makes up a large proportion of the area of first panel 32 and is retained in slots 92 of frame 70.

Base 18 is provided with a shelf 94 to receive the tongue 96 of second panel 34 when cover 24 is lowered to the fully closed position. Rabbets 52 allow for a snug and substantially airtight closure of cover 24 in abutment with second sidewall 22

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

Having described the invention, I claim:

1. Apparatus for veterinary treatment comprising
a planar base having a rear wall upstanding thereon,
sidewalls upstanding on the base, at least one sidewall joined to a first end of the rear wall,
at least a second sidewall joined to an opposing end of the rear wall,
a cover hinged to a top of the rear wall,
the cover comprising a first panel joined to a second panel,
the second panel and the first panel defining an angle therebetween,
the cover cooperating with the base, the rear wall and the sidewalls to define a closed enclosure for a small animal,
the first panel of the cover touching the planar base when the cover is positioned to close the enclosure,
an intake port in one of the sidewalls or in the rear wall,
an exhaust port in one of the sidewalls or in the rear wall,
whereby a medicament useful for treatment of an animal may be injected through the intake port into an interior of the closed enclosure.

2. The apparatus of claim 1 wherein
the angle defined by the second panel and the first panel is between forty-five and one hundred thirty-five degrees.

3. The apparatus of claim 1 wherein
the second panel and the first panel define a substantial perpendicular.

4. The apparatus of claim 1 wherein
the intake port is coupled to nebulizer apparatus.

5. The apparatus of claim 1 wherein
the intake port and the exhaust port are of substantially equal area.

6. The apparatus of claim 1 wherein
at least one bracket is fixed to the rear wall at an outside surface thereof,
the cover touchingly engaging the bracket when the cover is fully open.

7. The apparatus of claim 1 wherein
at least one catch member is mounted to one of the cover and the base,
at least one latch member is mounted to the other of the cover and the base,
the at least one latch member interlockable to said at least one catch member.

8. The apparatus of claim 1 wherein
a first of the sidewalls is joined at a substantial perpendicular to a first end of the rear wall,
a second of the sidewalls is joined at a substantial perpendicular to a second end of the rear wall,
the first panel of the cover is joined to the second panel thereof by a substantial perpendicular,
the intake port is located in the first of the sidewalls,
the exhaust port is located in the second of the sidewalls,
at least one manually operable latch is mounted to the cover,
a catch element interlockable with the at least one latch is mounted to the base,
a pair of brackets is fixed to the rear wall at an outside surface thereof,
the cover touchingly engaging the brackets when the cover is fully open,
each port includes a tube for attachment of a duct thereto,
a transparent window in each of the first panel and the second panel.

9. The apparatus of claim 1 wherein
the medicament is an inhalable anesthetic.

10. The apparatus of claim 1 wherein
the medicament is a drug in a nebulized state.

11. Apparatus for veterinary treatment comprising
a planar bottom wall having a rear wall upstanding thereon,
a first sidewall permanently joined to the rear wall,
the first sidewall upstanding on the base,
a second sidewall permanently joined to the rear wall and spaced apart from the at least a first sidewall,
a cover hinged to a top of the rear wall,
the cover comprising a first panel joined to a second panel,
the first panel of the cover touching the bottom wall when the cover is positioned to close the enclosure,
the cover cooperating with the bottom wall, the rear wall and the sidewalls to define a closed enclosure for a small animal,
an intake port in one of the sidewalls or the rear wall,
an exhaust port in one of the sidewalls or the rear wall,
whereby a fluid useful for treatment of an animal may be injected through the intake port into an interior of the closed enclosure.

12. The apparatus of claim 11 wherein
the rear wall is elongate,
the first sidewall is fixed to a first end of the rear wall,
the second sidewall is fixed to an opposing end of the rear wall,
the cover hinged to the top of the rear wall.

13. The apparatus of claim 11 wherein
the second panel and the first panel defines a fixed angle therebetween.

14. The apparatus of claim 11 wherein
the second panel and the first panel defining approximately a perpendicular therebetween.

15. The apparatus of claim 11 wherein
a latch selectively secures the first panel to the planar bottom wall.

16. Apparatus for veterinary treatment comprising
a base having a rear wall upstanding thereon,
sidewalls upstanding on the base, at least one sidewall joined to a first end of the rear wall,
at least a second sidewall joined to an opposing end of the rear wall,
a cover hinged to a top of the rear wall,
the cover comprising a first panel joined to a second panel,
the second panel and the first panel defining an angle therebetween,
the cover cooperating with the base, the rear wall and the sidewalls to define a closed enclosure for a small animal,
an intake port in one of the sidewalls,
an exhaust port in one of the sidewalls,
at least one bracket fixed to the rear wall at an outside surface thereof,
the cover touchingly engaging the bracket when the cover is fully open,
the at least one bracket comprising a base and an angularly upwardly extending arm,
the arm extending away from the outside surface of the rear wall,
the cover abutting the arm of the at least one bracket when the cover is fully open,
whereby a medicament useful for treatment of an animal may be injected through the intake port into an interior of the closed enclosure.

17. An inhalation therapy enclosure for veterinary use comprising
a planar floor and a multiplicity of sidewalls,
a first of the multiplicity of sidewalls being a rear wall,
a second of the sidewalls joined to an end of the wall,
a third of the sidewalls joined to an opposing end of the rear wall, the rear wall and the second and third of the sidewalls standing upright upon the floor and fixed thereto, a cover hinged to the rear wall at substantially a top thereof, the cover comprising a first panel joined to a second panel, the second panel of the cover providing a top wall when the cover is in a closed position, the first panel providing a front wall of the enclosure when the cover is in the closed position, the first panel touching the floor when the cover is in the closed position, an intake port through one of the sidewalls, an exhaust port through one of the sidewalls, the cover cooperating with the floor and the sidewalls to define a closed enclosure for an animal, whereby a medicament may be provided through the intake port into an interior of the closed enclosure.

* * * * *